(12) United States Patent
Ishihara et al.

(10) Patent No.: US 7,647,514 B2
(45) Date of Patent: Jan. 12, 2010

(54) REDUCING POWER CONSUMPTION AT A CACHE

(75) Inventors: Toru Ishihara, Fukuoka (JP); Farzan Fallah, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 413 days.

(21) Appl. No.: 11/198,559

(22) Filed: Aug. 5, 2005

(65) Prior Publication Data

US 2007/0033423 A1 Feb. 8, 2007

(51) Int. Cl.
G06F 1/32 (2006.01)
(52) U.S. Cl. .................. 713/320; 713/300; 713/324
(58) Field of Classification Search .......... 713/300–375
See application file for complete search history.

(56) References Cited

U.S. PATENT DOCUMENTS

| | | | | |
|---|---|---|---|---|
| 5,761,715 | A * | 6/1998 | Takahashi .................. | 711/128 |
| 6,175,957 | B1 * | 1/2001 | Ju et al. ..................... | 717/156 |
| 6,944,714 | B2 * | 9/2005 | Lesarte et al. .............. | 711/128 |
| 7,127,560 | B2 * | 10/2006 | Cohen et al. ............... | 711/141 |
| 2003/0154345 | A1 * | 8/2003 | Lyon ......................... | 711/122 |

OTHER PUBLICATIONS

ARM Ltd., "ARM Processor Core Overview," http:www.arm.com/products/CPUc/, date unknown.
Fujitsu Ltd., 128 Mbit (x16bit) Burst Mode Flash Memory MBM29BS12DH, http/edevice,fujitsu.com/fj/MARCOM//find/21-2c/, date unknown.
Gallup et al., "Testability Features of the 68040," in Proc. of International Test Conference, pp. 749-757, Sep. 1990.
Ghose et al., "Reducing Power in Superscalar Processor Caches Using Subbanking, Multiple Line Buffers and Bit-Line Segmentation," In Proc. of ISLPED, pp. 70-75, Aug. 1999.
Gosh et al., "Cache Miss Equations: A Compiler Framework for Analyzing and Tuning Memory Behavior," ACM Trans. on Programming Languages and Systems, vol. 21, No. 4, pp. 703-746, Jul. 1999.
Hashemi et al., "Cache Line Coloring Procedure Placement Using Real and Estimated Profiles," Department of Electrical Engineering, pp. 1-21, date unknown.
Hicks et al., "Analysis of Power Consumption in Memory Hierarchies," in Proc. of ISLPED, pp. 239-242, Aug. 1997.

(Continued)

*Primary Examiner*—Mark Connolly
*Assistant Examiner*—Paul B Yanchus, III
(74) *Attorney, Agent, or Firm*—Baker Botts L.L.P.

(57) ABSTRACT

In one embodiment, a method for reducing power consumption at a cache includes determining a nonuniform architecture for a cache providing an optimum number of cache ways for each cache set in the cache. The nonuniform architecture allows cache sets in the cache to have associativity values that differ from each other. The method also includes implementing the nonuniform architecture in the cache to reduce power consumption at the cache. In another embodiment, the method also includes determining a code placement according to which code is writeable to a memory separate from the cache. The code placement reduces occurrences of inter cache-line sequential flows when the code is loaded from the memory to the cache. The method also includes compiling the code according to the code placement and writing the code to the memory for subsequent loading from the memory to the cache according to the code placement to further reduce power consumption at the cache.

31 Claims, 2 Drawing Sheets

OTHER PUBLICATIONS

Hill et al., "Evaluating Associativity in CPU Cache," IEEE Trans. on Computers, vol. 38, No. 12, pp. 1612-1630, Dec. 1989.

Hill, "The ARM 10 Family of Embedded Advanced Microprocessor Cores," In Proc. of HOT-Chips 13, Aug. 2001.

Hwu et al., "Achieving High Instruction Cache Performance with an Optimizing Compiler," In Proc. of ISCA, pp. 242-251, May 1989.

IBM Microelectronics Division, "The PowerPC 440 Core," 1999.

Koren et al., "Fault Tolerance in VLSI Circuits," IEEE Computer, Special Issue in Fault-Tolerant Systems, vol. 23, pp. 73-83, Jul. 1990.

Li et al., A Framework for Estimating and Minimizing Energy Dissipation of Embedded HW/SW Systems, In Proc. of DAC, pp. 188-193, Jun. 1998.

Luo et al., "A Fault-Tolerant Multiprocessor Cache Memory," Proc. IEEE Workshop on Memory Technology, Design, and Testing, pp. 52-57, Aug. 1994.

Lucente et al., "Memory System Reliability Improvement Through Associative Cache Redundancy," In Proc. of IEEE Custom Integrated Circuits Conference, pp. 19.6.1-19.6.4, May 1990.

Malik et al., "A Low Power Unified Cache Architecture Providing Power and Performance Flexibility," In Porc. of ISLPED, pp. 241-243, Jul. 2000.

McFarling, S., "Program Optimization for Instruction Caches," In Proc. of Int'l Conference on Architecture Support for Programming Languages and Operating Systems, pp. 183-191, Apr. 1989.

Montanaro et al., "A 160 MHz, 32b, 0.5W CMOS RISC Microprocessor," In Procedure of International Solid-State Circuits Conference, Feb. 1996.

Motorola Inc., PowerPC 604e RISC Microprocessor Technical Summary, 1996.

Micron Technologies, Inc., "Low Power Flash," http/www.micron.com/products/flash/lowpower/, date unknown.

Ooi et all, "Fault-Tolerant Architecture in a Cache Memory Control LSI," IEEE Journal of Solid-State Circuits, vol. 27, No. 4, pp. 507-514, Apr. 1992.

Panda et al., "Memory Organization for Improved Data Cache Performance in Embedded Processors," in Proce. of the 9th International Symposium on System Syntheses, In Proce of the 9th International Symposium on System Synthesis, pp. 90-95, Nov. 1996.

Panda et al., "Architectural Exploration and Optimization of Local Memory in Embedded Systems," In Proc. of ISSIS, pp. 90-97, Sep. 1997.

Panwar et al., "Reducing the Frequency of Tag Compares for Lower Power I-Cache Design," In Proc. of ISLPD, pp. 57-62, Aug. 1995, Aug. 1992.

Patterson et al., "Architecture of a VLSI Instruction Cache for a RISC," in Proc. 10th Annual International Symposium on Computer Architecture, vol. 11, No. 3, pp. 108-116, Jun. 1993.

Pour et al., "Performance Implications on Tolerating Cache Faults," IEEE Trans. on Computers, vol. 42, No. 3, pp. 257-267, Mar. 1993.

Saxena et al., "Fault-Tolerant Features in the HaL Memory Management Unit," IEEE Trans. on Computers, vol. 44, No. 2, pp. 170-179, Feb. 1995.

Segars, S., "Low Power Design Techniques for Microprocessors," ISSCC Tutorial, Feb. 2001.

Shirvani et al., "PADded Cache: A New Fault-Tolerance Technique for Cache Memories," In Proc. of 17th IEEE VLSI Test Symposium, pp. 440-445, Apr. 1999.

Shiue et al., "Memory Exploration for Low Power, Embedded Systems," In Proc. of DAC, pp. 140-145, Jun. 1999.

Sohi, G., "Cache Memory Organization to Enhance the Yield of High Performance VLSI Processors," IEEE Trans. on Computers, vol. 38, No. 4, pp. 484-492, Apr. 1989.

Stapper et al, "Yield Model for Productivity Optimization of VLSI Memory Chips with Redundancy and Partially Good Product," IBM Journal of Research and Development, vol. 20, pp. 398-409, 1980.

Su et al., "Cache Design Trade-offs for Power and Performance Optimization: A Case Study," in Proc. of ISLPED, pp. 63-68, Aug. 1995.

Suzuki et al., V83OR/AV: Embedded Multimedia Superscalar RISC Processor, IEEE Micro, vol. 18, No. 2, pp. 36-47, Apr. 1998.

"The SimpleScalar Architectural Research Tool Set, Version 2.0," http://www.cs.wisc.edu/-mscalar/simplescalar.html, date unknown.

Tomiyama et al., "Optimal Code Placement of Embedded Software for Instruction Caches," In Proc. of European Design and Test Conference, pp. 96-101, Mar. 1996.

Vergos et al., "Performance Recovery in Direct-Mapped Faulty Caches via the Use of a Very Small Fully Associative Spare Cache," In Procedure of International Computer Performance and Dependability Symposium, pp. 326-332, Apr. 1995.

Vergos et al., "Efficient Fault Tolerant Cache Memory Design," Microprocessing and Microprogramming Journal, vol. 41, No. 2, pp. 153-169, May 1995.

* cited by examiner

REDUCING POWER CONSUMPTION AT A CACHE

TECHNICAL FIELD OF THE INVENTION

This invention relates in general to memory systems and more particularly to reducing power consumption at a cache.

BACKGROUND OF THE INVENTION

A cache on a processor typically consumes a substantial amount of power. As an example, an instruction cache on an ARM920T processor accounts for approximately 25% of power consumption by the processor. As another example, an instruction cache on a StrongARM SA-110 processor, which targets low-power applications, accounts for approximately 27% of power consumption by the processor.

SUMMARY OF THE INVENTION

Particular embodiments of the present invention may reduce or eliminate problems and disadvantages associated with previous memory systems.

In one embodiment, a method for reducing power consumption at a cache includes determining a nonuniform architecture for a cache providing an optimum number of cache ways for each cache set in the cache. The nonuniform architecture allows cache sets in the cache to have associativity values that differ from each other. The method also includes implementing the nonuniform architecture in the cache to reduce power consumption at the cache.

In another embodiment, the method also includes determining a code placement according to which code is writeable to a memory separate from the cache. The code placement reduces occurrences of inter cache-line sequential flows when the code is loaded from the memory to the cache. The method also includes compiling the code according to the code placement and writing the code to the memory for subsequent loading from the memory to the cache according to the code placement to further reduce power consumption at the cache.

Particular embodiments of the present invention may provide one or more technical advantages. As an example and not by way of limitation, particular embodiments may reduce power consumption at a cache. Particular embodiments provide a nonuniform cache architecture for reducing power consumption at a cache. Particular embodiments facilitate code placement for reducing tag lookups, way lookups, or both in a cache to reduce power consumption at the cache. Particular embodiments facilitate simultaneous optimization of cache architecture and code placement to reduce cache way or tag accesses and cache misses. Particular embodiments may provide all, some, or none of these technical advantages. Particular embodiments may provide one or more other technical advantages, one or more of which may be readily apparent to those skilled in the art from the figures, descriptions, and claims herein.

BRIEF DESCRIPTION OF THE DRAWINGS

To provide a more complete understanding of the present invention and features and advantages thereof, reference is made to the following description, taken in conjunction with the accompanying drawings, in which.

DESCRIPTION OF EXAMPLE EMBODIMENTS

Figure 1:
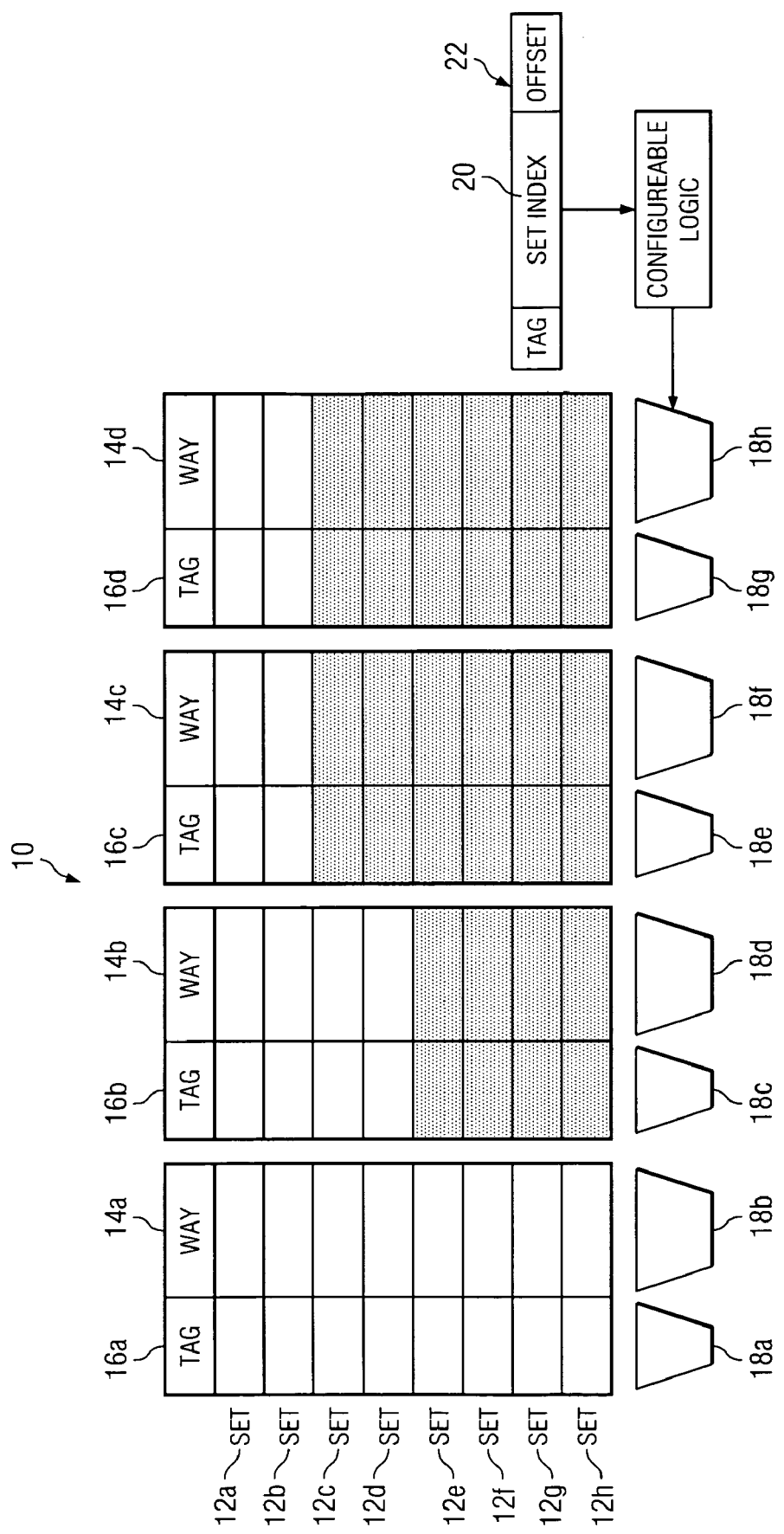
FIG. 1 illustrates an example nonuniform cache architecture for reducing power consumption at a cache.

FIG. 1 illustrates an example nonuniform cache architecture for reducing power consumption at a cache 10. In particular embodiments, cache 10 is a component of a processor used for temporarily storing code for execution at the processor. Reference to "code" encompasses one or more executable instructions, other code, or both, where appropriate. Cache 10 includes multiple sets 12, multiple ways 14, and multiple tags 16. A set 12 logically intersects multiple ways 14 and multiple tags 16. A logical intersection between a set 12 and a way 14 includes multiple memory cells adjacent each other in cache 10 for storing code. A logical intersection between a set 12 and a tag 16 includes one or more memory cells adjacent each other in cache 10 for storing data facilitating location of code stored in cache 10, identification of code stored in cache 10, or both. As an example and not by way of limitation, a first logical intersection between set 12a and tag 16a may include one or more memory cells for storing data facilitating location of code stored at a second logical intersection between set 12a and way 14a, identification of code stored at the second logical intersection, or both. Cache 10 also includes multiple sense amplifiers 18. In particular embodiments, sense amplifiers 18 are used to read contents of memory cells in cache 10. Although a particular cache 10 including particular components arranged according to a particular organization is illustrated and described, the present invention contemplates any suitable cache 10 including any suitable components arranged according to any suitable organization. Moreover, the present invention is not limited to a cache 10, but contemplates any suitable memory system.

In particular embodiments, a nonuniform architecture in cache 10 reduces power consumption at cache 10, current leakage from cache 10, or both. A nonuniform architecture allows sets 12 to have associativity values that are different from each other. In particular embodiments, a first set 12 has an associativity value different from a second set 12 if first set 12 intersects a first number of active ways 14, second set 12 intersects a second number of active ways 14, and the first number is different from the second number. As an example and not by way of limitation, according to a nonuniform architecture in cache 10, way 14a, way 14b, way 14c, and way 14d are all active in set 12a and set 12b; only way 14a and way 14b are active in set 12c and set 12d; and only way 14a is active in set 12e, set 12f, set 12g, and set 12h. In particular embodiments, an active memory cell is useable for storage and an inactive memory cell is unuseable for storage.

In particular embodiments, an optimum number of cache ways in each cache set is determined during design of a cache 10. As an example and not by way of limitation, a hardware, software, or embedded logic component or a combination of two or more such components may execute an algorithm for determining an optimum number of cache ways in each cache set, as described below. One or more users may use one or more computer systems to provide input to and receive output from the one or more components. Reference to a "cache way" encompasses a way 14 in a cache 10, where appropriate. Reference to a "cache set" encompasses a set 12 in a cache 10, where appropriate. In particular embodiments, the number of active cache ways in cache 10 may be changed dynamically while an application program is running. In particular embodiments, one or more sleep transistors are useable to dynamically change the number of active cache ways in cache 10. In particular embodiments, a power supply to unused cache ways may be disconnected from the unused cache ways by eliminating vias used for connecting the power supply to memory cells in the unused cache ways. Unused memory cells may also be disconnected from bit and word lines in the same fashion.

In particular embodiments, a second valid bit may be used to mark an unused cache block. Reference to a "cache block" encompasses a logical intersection between a set 12 and a way 14, where appropriate. The cache block also includes a logical intersection between set 12 and a tag 16 corresponding to way 14, where appropriate. In particular embodiments, one or more valid bits are appended to each tag 16 in each set 12. In particular embodiments, such bits are part of each tag 16 in each set 12. If the second valid bit is 1, the corresponding cache block is not used for replacement if a cache miss occurs. Accessing an inactive cache block causes a cache miss. In particular embodiments, to reduce power consumption at nonuniform cache 10, sense amplifiers 18 of cache ways marked inactive in a cache set targeted for access are deactivated. In particular embodiments, this is implemented by checking a set index 20 of a memory address register 22. As an example and not by way of limitation, in nonuniform cache 10 illustrated in FIG. 1, sense amplifier 18c and sense amplifier 18d may be deactivated when set 12e, set 12f, set 12g, or set 12h is targeted for access. Sense amplifier 18e, sense amplifier 18f, sense amplifier 18g, and sense amplifier 18h may all be deactivated when set 12c, set 12d, set 12e, set 12f, set 12g, or set 12h is targeted for access.

Tag access and tag comparison need not be performed for all instruction fetches. Consider an instruction j executed immediately after an instruction i. There are three cases:

1. Intra Cache-Line Sequential Flow

This occurs when both i and j instructions reside on the same cache-line, and i is a non-branch instruction or an untaken branch.

2. Inter Cache-Line Sequential Flow

This case is similar to the first one, the only difference is that i and j reside on different cache-lines.

3. Nonsequential Flow

In this case, i is a taken branch instruction and j is its target.

In the first case, intra cache-line sequential flow, it is readily detectable that j and i reside in the same cache way. Therefore, a tag lookup for instruction j is unnecessary. On the other hand, a tag lookup and a way access are required for a nonsequential fetch, such as for example a taken branch (or nonsequential flow) or a sequential fetch across a cache-line boundary (or inter cache-line sequential flow). As a consequence, deactivating memory cells of tags 16 and ways 14 in cases of intra cache-line sequential flow reduces power consumption at cache 10. Particular embodiments use this or a similar inter line way memorization (ILWM) technique.

Figure 2A:
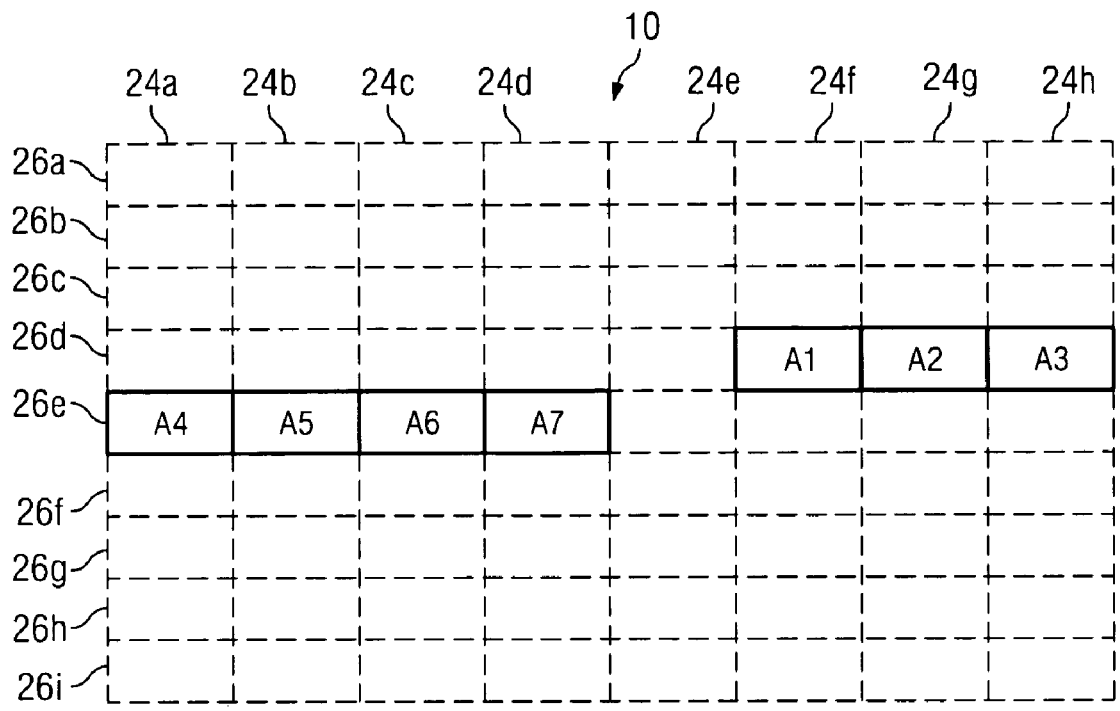
FIGS. 2A and 2B illustrate example code placement for reducing power consumption at a cache.
Figure 2B:
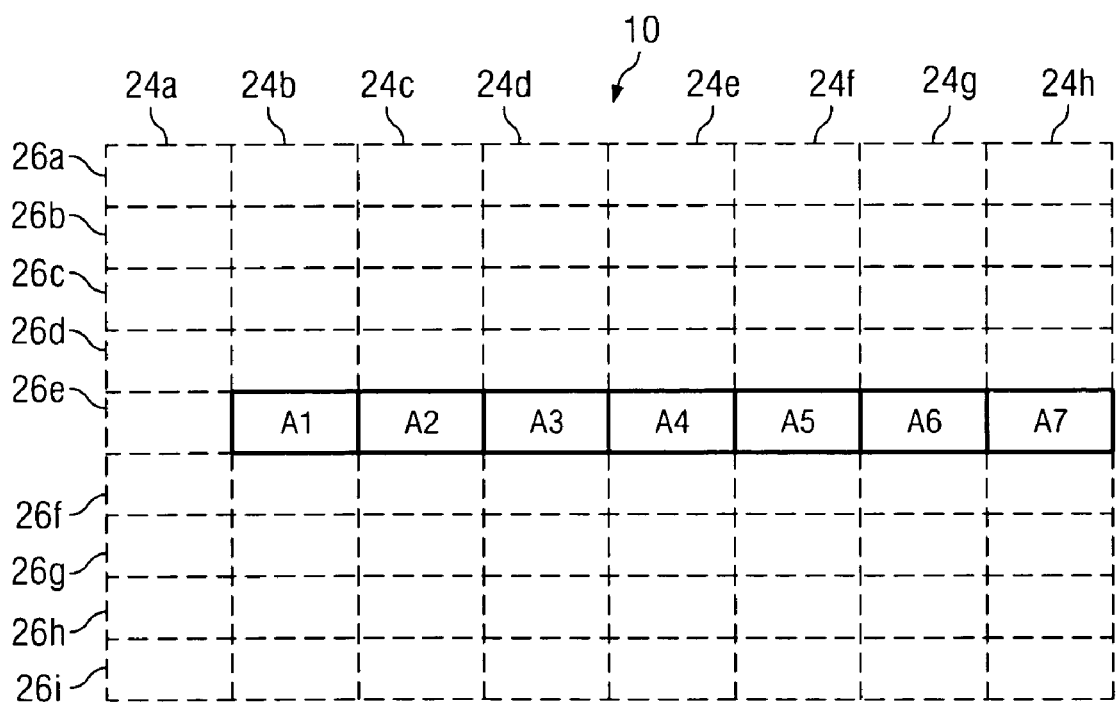

FIGS. 2A and 2B illustrate example code placement for reducing power consumption at a cache 10. Consider a basic block of seven instructions. The basic block is designated A, and the instructions are designated A1, A2, A3, A4, A5, A6, and A7. A7 is a taken branch, and A3 is not a branch instruction. In FIG. 2A, A7 resides at word 24d of cache line 26e. A3 resides at word 24h of cache line 26d. A tag lookup is required when A3 or A7 is executed because, in each case, it is unclear whether a next instruction resides in cache 10. However, in FIG. 2B, A is located in an address space of cache 10 so that A does not span any cache-line boundaries. Because A does not span any cache-line boundaries, a cache access and a tag access may be eliminated for A3. In particular embodiments, the placement of basic blocks in main memory is changed so that frequently accessed basic blocks do not span any cache-line boundaries (or span as few cache-line boundaries as possible) when loaded into cache 10 from main memory.

Decreasing the number of occurrences of inter cache-line sequential flows reduces power consumption at cache 10. While increasing cache-line size tends to decrease such occurrences, increasing cache-line size also tends to increase the number of off-chip memory accesses associated with cache misses. Particular embodiments use an algorithm that takes this trade-off into account and explores different cache-line sizes to minimize total power consumption of the memory hierarchy.

Consider a direct-mapped cache 10 of size C (where $C=2^m$ words) having a cache-line size of L words. L consecutive words are fetched from the memory on a cache-read miss. In a direct-mapped cache 10, the cache line containing a word located at memory address M may be calculated by $$\left(\left\lfloor\frac{M}{L}\right\rfloor \bmod \frac{C}{L}\right).$$

Therefore, two memory locations $M_i$ and $M_j$ will map to the same cache line if the following condition holds:

$$\left(\left\lfloor\frac{M_i}{L}\right\rfloor - \left\lfloor\frac{M_j}{L}\right\rfloor\right) \bmod \frac{C}{L} = 0$$

The above equation may be written as:

$$(n \cdot C - L) < (M_i - M_j) < (n \cdot C + L) \tag{1}$$

where n is any integer. If basic blocks $B_i$ and $B_j$ are inside a loop having an iteration count of N and their memory locations $M_i$ and $M_j$ satisfy condition (1), cache conflict misses occur at least N times when executing the loop. This may be extended for a W-way set associative cache 10. A cache conflict miss occurs in a W-way set associative cache 10 if more than W different addresses with distinct $$\left\lfloor\frac{M}{L}\right\rfloor$$

values that satisfy condition (1) are accessed in a loop. M is the memory address. Therefore, the number of cache conflict misses can be easily calculated from cache parameters, such as, for example, cache-line size, the number of cache sets, the number of cache ways, the location of each basic block in the memory address space of cache 10, and the iteration count for each closed loop for a target application program. Particular embodiments optimize cache configuration and code placement more or less simultaneously to reduce dynamic and leakage power consumption at cache 10 and off-chip memory for a given performance constraint. In particular embodiments, an algorithm calculates the number of cache conflicts in each cache set for a given associativity.

The following notation may be used to provide an example problem definition for code placement:

$E_{memory}$, $E_{way}$, and $E_{tag}$: The energy consumption per access for the main memory, a single cache way, and a cache-tag memory, respectively.

$P_{static}$: The static power consumption of the main memory.

$TE_{memory}$ and $TE_{cache}$: The total energy consumption of the main memory, e.g., the off-chip memory, and cache 10, respectively.

$P_{leakage}$: The leakage power consumption of a 1-byte cache memory block.

$TE_{leakage}$: The total energy consumption of the cache memory due to leakage.

$W_{bus}$: The memory access bus width (in bytes).

$W_{inst}$: The size of an instruction (in bytes).

$S_{cache}$: The number of sets in a cache memory.

$C_{access}$: The number of CPU cycles required for a single memory access.

$C_{wait}$: The number of wait-cycles for a memory access.

$F_{clock}$: The clock frequency of CPU.

$n_{line}$: The line size of the cache memory (in bytes).

$a_i$: The number of ways in the $i^{th}$ cache set.

$N_{miss}$: The number of cache misses.

$N_{inst}$: The number of instructions executed.

$X_i$: The number of "full-way accesses" for the $i^{th}$ cache set. In the "full-way" access all cache ways and cache-tags in the target cache set are activated. A "full-way access" is necessary in case of an inter-cache-line sequential flow or a non-sequential flow. Otherwise, only a single cache way is activated.

$T_{total}$, and $T_{const}$: The total execution time and the constraint on it.

$P_{total}$: The total power consumption of the memory system.

Assume $E_{memory}$, $E_{way}$, $E_{tag}$, $P_{static}$, $P_{leakage}$, $W_{bus}$, $W_{inst}$, $S_{cache}$, $F_{clock}$, $C_{access}$, $C_{wait}$, and $T_{const}$ are given parameters. The parameters to be determined are $n_{line}$ and $a_i$. $N_{miss}$, $X_i$, and $T_{total}$ are functions of the code placement, $W_{bus}$, $W_{inst}$, $n_{line}$, and $a_i$. $N_{miss}$, $N_{inst}$, and $X_i$ may be found according to one or more previous methods. Since a cache 10 is usually divided into sub-banks and only a single sub-bank is activated per access, $E_{way}$ is independent of $n_{lines}$.

The following example problem definition may be used for code placement: for given values of $E_{memory}$, $E_{way}$, $E_{tag}$, $P_{static}$, $P_{leakage}$, $W_{bus}$, $W_{inst}$, $S_{cache}$, $F_{clock}$, $C_{access}$, $C_{wait}$, and the original object code, determine code placement, $n_{line}$ and $a_i$ to minimize $P_{total}$, the total power consumption of the memory hierarchy under the given time constraint $T_{const}$. $T_{total}$, $TE_{memory}$, $TE_{cache}$, $TE_{leakage}$, and $P_{total}$ may be calculated using the following formulas:

$$T_{total} = \frac{1}{F_{clock}} \cdot \left\{ N_{inst} + N_{miss} \cdot \left( C_{access} \cdot \frac{n_{line}}{W_{bus}} + C_{wait} \right) \right\}$$

$$TE_{memory} = E_{memory} \cdot N_{miss} \cdot \frac{n_{line}}{W_{bus}} + P_{static} \cdot T_{total}$$

$$TE_{cache} = E_{way} \cdot N_{inst} + E_{way} \cdot N_{miss} \cdot \frac{n_{line}}{W_{inst}} + E_{tag} \cdot$$

$$N_{miss} + E_{way} \cdot \sum_{i=0}^{S_{cache}} \{(a_i - 1) \cdot X_i\} + E_{tag} \cdot \sum_{i=0}^{S_{cache}} (a_i \cdot X_i)$$

$$TE_{leakage} = P_{leakage} \cdot T_{total} \cdot n_{line} \cdot \sum_{i=0}^{S_{cache}} a_i$$

$$P_{total} = \frac{(TE_{memory} + TE_{cache} + TE_{leakage})}{T_{total}}, T_{total} \leq T_{const}$$

In particular embodiments, an algorithm starts with an original cache configuration ($n_{lines}=32$, $S_{cache}=8$, $a_i=64$). In the next step, the algorithm finds the optimal location of each block of the application program in the address space. In particular embodiments, this is done by changing the order of placing functions in the address space and finding the best ordering. For each ordering, the algorithm greedily reduces the energy by iteratively finding a cache set for which reducing the number of cache ways by a factor of two gives the largest power reduction. The power consumption ($P_{total}$) and the run-time ($T_{total}$) are found by calculating the number of cache misses for a given associativity. The calculation may be done without simulating cache 10 and by analyzing an iteration count of each loop and the location of each basic block in the address space for the application program. The ordering which gives the minimum energy is selected along with the optimal number of cache ways for each cache set. The algorithm performs the above steps for different cache-line sizes and continues as long as the power consumption reduces. The ordering of functions may be fixed when the cache-line sizes are changed. This is a good simplification because the optimum ordering of functions usually does not change widely when cache-line sizes vary by a factor of two. In particular embodiments, the computation time of the algorithm is quadratic in terms of the number of functions and linear in terms of the number of loops of the application program.

By way of example and not by way of limitation, the following pseudocode embodies one or more example elements of the algorithm described above:

```
Procedure MinimizePower
Input:      E_memory, E_way, E_tag, P_leakage, W_bus, W_inst, S_cache,
            F_clock, C_access, C_wait, T_count, P_static,
            and original object code.
Output:     n_line, a set of a_i, and order of functions in the
            optimized object code
Let L be the list of functions in the target program sorted in
descending order of their execution counts;
    P_min = T_min = infinity;
    for each n_line ∈ {32,64,128,256,512} do
        P_init = P_min; T_init = T_min;
        repeat
            P_min = P_init, T_min = T_init
            for (t=0; t<| L| ;t++) do
                p = L[t];
                for each p'∈ L and p'≠ p do
                    Insert function p in the place of p';
                    Set all a_i to 64 and calculate P_total and T_total;
                    repeat
                        1. Find a cache-set for which
                           reducing the number of cache
                           ways by a factor of 2 results
                           in the largest power reduction;
                        2. Divide the number of cache-
                           ways for the cache-set by
                           2 and calculate P_total
                           and T_total;
                    until ((P_total stops decreasing) or (T_total >
                    T_const))
                    if (P_total ≤ P_min & T_total ≤ T_min)
                    then
                        P_min = P_total; T_min = T_total; BEST_location =
                        p';
                    end if
                end for
                Put function p in the place of BEST_location
            end for
        until (P_min stops decreasing)
        if (P_init = P_min & T_init ≤ T_const) then
            Output BEST_line, BEST_ways and BEST_order; Exit;
        else
            BEST_line = n_line;        BEST_ways= a set of a_i,
            BEST_order = order of functions;
        end if
    end for
end Procedure
```

In particular embodiments, a hardware, software, or embedded logic component or a combination of two or more such components execute one or more steps of the algorithm above. One or more users may use one or more computer systems to provide input to and receive output from the one or more components.

Particular embodiments have been used to describe the present invention. A person having skill in the art may comprehend one or more changes, substitutions, variations, alterations, or modifications to the particular embodiments used to describe the present invention that are within the scope of the appended claims. The present invention encompasses all such changes, substitutions, variations, alterations, and modifications.

What is claimed is:

1. A method for reducing power consumption at a cache, the method comprising:
   determining a nonuniform architecture for a cache providing an optimum number of cache ways for each of a plurality of cache sets in the cache, the nonuniform architecture allowing the cache sets in the cache to have associativity values that differ from each other, the optimum number of cache ways being determined based on iteratively ordering each block of data in an address space of the cache and identifying an ordering that provides the minimum energy usage;
   implementing the nonuniform architecture in the cache to reduce power consumption at the cache;
   disconnecting a power supply to those cache ways of each cache set that are determined to not be a part of the optimum number of cache ways for each cache set in order to further reduce power consumption at the cache.

2. The method of claim 1, further comprising:
   determining a code placement according to which code is writeable to a memory separate from the cache, the code placement reducing occurrences of inter cache-line sequential flows when the code is loaded from the memory to the cache;
   compiling the code according to the code placement; and
   writing the code to the memory for subsequent loading from the memory to the cache according to the code placement to further reduce power consumption at the cache.

3. The method of claim 1, wherein the cache is an instruction cache on a processor.

4. The method of claim 1, further comprising dynamically changing one or more associativity values of one or more cache sets in the cache during execution of one or more components of program at a processor associated with the cache.

5. The method of claim 1, further comprising using one or more valid bits to mark one or more cache blocks in the cache that are inactive according to the nonuniform architecture.

6. The method of claim 5, wherein a valid bit for marking a cache block is appended to a cache tag associated with the cache block.

7. The method of claim 1, further comprising, to prevent access of cache blocks in the cache that are inactive according to the nonuniform architecture, deactivating one or more sense amplifiers associated with one or more cache ways in a cache set targeted for access that are inactive according to the nonuniform architecture.

8. The method of claim 1, wherein disconnecting the power supply comprises disconnecting vias connecting the cache ways of the cache to the power supply.

9. The method of claim 1, further comprising disconnecting from bit lines and word lines in the cache memory cells in the cache that are inactive according to the nonuniform architecture.

10. The method of claim 1, further comprising using a combination of a lock bit and a valid bit to mark a cache way in the cache that is inactive according to the nonuniform architecture.

11. Logic for reducing power consumption at a cache, the logic encoded in one or more media and when executed operable to:
   determine a nonuniform architecture for a cache providing an optimum number of cache ways for each of a plurality of cache sets in the cache, the nonuniform architecture allowing the sets in the cache to have associativity values that differ from each other, the optimum number of cache ways being determined based on iteratively ordering each block of data in an address space of the cache and identifying an ordering that provides the minimum energy usage;
   implement the nonuniform architecture in the cache to reduce power consumption at the cache;
   disconnect a power supply to those cache ways of each cache set that are determined to not be a part of the optimum number of cache ways for each cache set in order to further reduce power consumption at the cache.

12. The logic of claim 11, further operable to:
   determine a code placement according to which code is writeable to a memory separate from the cache, the code placement reducing occurrences of inter cache-line sequential flows when the code is loaded from the memory to the cache; and
   compile the code according to the code placement for writing to the memory for subsequent loading from the memory to the cache according to the code placement to further reduce power consumption at the cache.

13. The logic of claim 11, wherein the cache is an instruction cache on a processor.

14. The logic of claim 11, wherein one or more associativity values of one or more cache sets in the cache are dynamically changeable during execution of one or more components of program at a processor associated with the cache.

15. The logic of claim 11, wherein one or more valid bits mark one or more cache blocks in the cache that are inactive according to the nonuniform architecture.

16. The logic of claim 15, wherein a valid bit for marking a cache block is appended to a cache tag associated with the cache block.

17. The logic of claim 11, wherein, to prevent access of cache blocks in the cache that are inactive according to the nonuniform architecture, one or more sense amplifiers associated with one or more cache ways in a cache set that are inactive according to the nonuniform architecture are deactivated when the cache set is targeted for access.

18. The logic of claim 11, wherein vias connecting the cache ways of the cache to the power supply are disconnected to disconnect the cache ways of the cache from the power supply.

19. The logic of claim 11, memory cells in the cache that are inactive according to the nonuniform architecture are disconnected from bit lines and word lines in the cache.

20. The logic of claim 11, wherein a combination of a lock bit and a valid bit mark a cache way in the cache that is inactive according to the nonuniform architecture.

21. A system for reducing power consumption at a cache, the system comprising:
   a cache; and
   a nonuniform architecture implemented in the cache to reduce power consumption at the cache, the nonuniform architecture providing an optimum number of cache ways for each of a plurality of cache sets in the cache and allowing the cache sets in the cache to have associativity values that differ from each other, the optimum number of cache ways being determined based on iteratively ordering each block of data in an address space of the cache and identifying an ordering that provides the minimum energy usage, the nonuniform architecture disconnecting a power supply to those cache ways of each cache set that are determined to not be a part of the optimum number of cache ways for each cache set in order to further reduce power consumption at the cache.

22. The system of claim 21, further comprising a memory separate from the cache, code having been compiled and written to the memory according to a code placement reducing occurrences of inter cache-line sequential flows when the code is loaded from the memory to the cache, the code being loadable from the memory to the cache according to the code placement to further reduce power consumption at the cache.

23. The system of claim 21, wherein the cache is an instruction cache on a processor.

24. The system of claim 21, wherein one or more associativity values of one or more cache sets in the cache are dynamically changeable during execution of one or more components of program at a processor associated with the cache.

25. The system of claim 21, wherein one or more valid bits mark one or more cache blocks in the cache that are inactive according to the nonuniform architecture.

26. The system of claim 25, wherein a valid bit for marking a cache block is appended to a cache tag associated with the cache block.

27. The system of claim 21, wherein, to prevent access of cache blocks in the cache that are inactive according to the nonuniform architecture, one or more sense amplifiers associated with one or more cache ways in a cache set that are inactive according to the nonuniform architecture are deactivated when the cache set is targeted for access.

28. The system of claim 21, wherein vias connecting the cache ways of the cache to the power supply are disconnected to disconnect the cache ways of the cache from the power supply.

29. The system of claim 21, memory cells in the cache that are inactive according to the nonuniform architecture are disconnected from bit lines and word lines in the cache.

30. The system of claim 21, wherein a combination of a lock bit and a valid bit mark a cache way in the cache that is inactive according to the nonuniform architecture.

31. A system for reducing power consumption at a cache, the system comprising:
    means for determining a nonuniform architecture for a cache providing an optimum number of cache ways for each of a plurality of cache set in the cache, the nonuniform architecture allowing the cache sets in the cache to have associativity values that differ from each other, the optimum number of cache ways being determined based on iteratively ordering each block of data in an address space of the cache and identifying an ordering that provides the minimum energy usage;
    means for implementing the nonuniform architecture in the cache to reduce power consumption at the cache;
    means for disconnecting a power supply to those cache ways of each cache set that are determined to not be a part of the optimum number of cache ways for each cache set in order to further reduce power consumption at the cache.

* * * * *